(12) United States Patent
Nishi et al.

(10) Patent No.: US 12,409,562 B2
(45) Date of Patent: Sep. 9, 2025

(54) METHOD FOR CONTROLLING ROBOT AND SYSTEM

(71) Applicant: Hitachi, Ltd., Tokyo (JP)

(72) Inventors: Kaichiro Nishi, Tokyo (JP); Nobuaki Nakasu, Tokyo (JP)

(73) Assignee: HITACHI, LTD., Tokyo (JP)

( * ) Notice: Subject to any disclaimer, the term of this patent is extended or adjusted under 35 U.S.C. 154(b) by 134 days.

(21) Appl. No.: 18/408,963

(22) Filed: Jan. 10, 2024

(65) Prior Publication Data
US 2024/0261980 A1    Aug. 8, 2024

(30) Foreign Application Priority Data
Feb. 6, 2023   (JP) ................. 2023-016326

(51) Int. Cl.
*B25J 13/02* (2006.01)
*B25J 9/16* (2006.01)
*B25J 13/00* (2006.01)
*B25J 13/08* (2006.01)

(52) U.S. Cl.
CPC .............. *B25J 13/02* (2013.01); *B25J 9/161* (2013.01); *B25J 13/006* (2013.01); *B25J 9/163* (2013.01); *B25J 13/085* (2013.01)

(58) Field of Classification Search
CPC . B25J 13/02; B25J 9/161; B25J 13/006; B25J 9/163; B25J 13/085; B25J 9/1602
USPC ................. 700/245–264; 318/568.11–568.25
See application file for complete search history.

(56) References Cited

U.S. PATENT DOCUMENTS

| 5,050,919 A * | 9/1991 | Yakou | B25J 15/0475 |
| | | | 294/185 |
| 5,770,001 A * | 6/1998 | Nagayama | G02B 6/3833 |
| | | | 156/557 |
| 7,708,517 B2 * | 5/2010 | Nakamura | B62D 5/006 |
| | | | 700/192 |
| 8,295,975 B2 * | 10/2012 | Arimatsu | G06T 1/0014 |
| | | | 700/216 |
| 8,942,845 B2 * | 1/2015 | Yamaguchi | B25J 15/08 |
| | | | 901/41 |
| 9,026,234 B2 * | 5/2015 | Suzuki | B25J 9/1669 |
| | | | 700/1 |

(Continued)

FOREIGN PATENT DOCUMENTS

WO    2022/172873 A1    8/2022

*Primary Examiner* — Jaime Figueroa
(74) *Attorney, Agent, or Firm* — Volpe Koenig

(57) ABSTRACT

The computer is connected to a robot including a hand which grips a workpiece, and a machining device including a gripping mechanism which grips the workpiece, acquires first operation information regarding an operation state of the robot and second operation information regarding an operation state of the machining device; and controls the robot to cause the robot to grip the workpiece and install the workpiece in the gripping mechanism In the control of the robot, the computer determines whether or not to start correction processing of correcting a position and an orientation of the workpiece with respect to the gripping mechanism based on the second operation information, executes the correction processing using the first operation information and the second operation information, and determines whether or not to end the correction processing based on the second operation information.

15 Claims, 14 Drawing Sheets

(56) References Cited

U.S. PATENT DOCUMENTS

| | | | | |
|---|---|---|---|---|
| 10,335,951 B2* | 7/2019 | Yamada | | B25J 13/082 |
| 10,839,261 B2* | 11/2020 | Yamada | | G06V 10/242 |
| 11,171,431 B2* | 11/2021 | Iwai | | H01R 12/89 |
| 11,247,304 B2* | 2/2022 | Kuriya | | B23Q 7/048 |
| 11,376,739 B2* | 7/2022 | Furukawa | | B23Q 7/04 |
| 11,504,861 B2* | 11/2022 | Ando | | B25J 9/1055 |
| 11,541,545 B2* | 1/2023 | Yamada | | B25J 9/1697 |
| 11,942,838 B2* | 3/2024 | Takeshima | | H02K 1/276 |
| 2004/0266276 A1* | 12/2004 | Hariki | | B25J 9/1697 439/894 |
| 2007/0116550 A1* | 5/2007 | Nakamura | | B62D 5/006 414/797 |
| 2011/0153076 A1* | 6/2011 | Noro | | B25J 9/1664 700/245 |
| 2012/0027545 A1* | 2/2012 | Marx | | G05B 19/401 700/250 |
| 2012/0065777 A1* | 3/2012 | Marx | | B25J 9/1638 901/31 |
| 2012/0065779 A1* | 3/2012 | Yamaguchi | | B25J 9/1612 294/213 |
| 2012/0065780 A1* | 3/2012 | Yamaguchi | | B25J 9/1633 294/213 |
| 2013/0054025 A1* | 2/2013 | Ito | | G05B 19/42 700/246 |
| 2013/0238124 A1* | 9/2013 | Suzuki | | B25J 9/16 700/250 |
| 2013/0238125 A1* | 9/2013 | Suzuki | | B25J 9/1697 700/253 |
| 2013/0238128 A1* | 9/2013 | Suzuki | | B25J 9/1697 700/258 |
| 2013/0345848 A1* | 12/2013 | Izumi | | B25J 15/0033 700/114 |
| 2014/0067126 A1* | 3/2014 | Watanabe | | G06T 7/75 382/103 |
| 2014/0114477 A1* | 4/2014 | Sato | | G05B 19/423 700/250 |
| 2014/0249677 A1* | 9/2014 | Yamaguchi | | B25J 15/0206 700/259 |
| 2015/0272684 A1* | 10/2015 | Tsusaka | | A61B 34/37 700/253 |
| 2015/0283704 A1* | 10/2015 | Watanabe | | B25J 9/1612 700/262 |
| 2016/0073514 A1* | 3/2016 | Watanabe | | B25J 15/0004 29/741 |
| 2017/0028561 A1* | 2/2017 | Yamada | | B25J 19/023 |
| 2017/0312921 A1* | 11/2017 | Kobayashi | | B25J 9/1687 |
| 2018/0021952 A1* | 1/2018 | Fujieda | | G05B 19/4069 700/264 |
| 2018/0276501 A1* | 9/2018 | Yamada | | G06V 10/454 |
| 2018/0333858 A1* | 11/2018 | Asano | | B25J 13/082 |
| 2019/0280405 A1* | 9/2019 | Iwai | | H05K 7/1061 |
| 2019/0329409 A1* | 10/2019 | Yamada | | B25J 9/1661 |
| 2020/0101613 A1* | 4/2020 | Yamada | | B25J 9/1687 |
| 2020/0171651 A1* | 6/2020 | Kuriya | | B23Q 7/048 |
| 2020/0361093 A1* | 11/2020 | Furukawa | | B25J 15/0052 |
| 2021/0129352 A1* | 5/2021 | Ando | | B25J 15/0038 |
| 2021/0154859 A1* | 5/2021 | Iijima | | B25J 13/085 |
| 2021/0387354 A1* | 12/2021 | Ota | | G05B 19/402 |
| 2023/0191543 A1* | 6/2023 | Feied | | B23P 23/02 29/33 R |
| 2023/0339115 A1* | 10/2023 | Hashimoto | | A61B 10/0045 |
| 2023/0347509 A1* | 11/2023 | Terasawa | | G06T 7/11 |

* cited by examiner

FIG. 3

| TASK NAME 301 | CORRECTION MODEL NAME 302 | TASK DESCRIPTION 303 |
|---|---|---|
| MACHINING DEVICE A WORKPIECE A SET | WORKPIECE SET CORRECTION MODEL | OPEN HAND →MOVE WORKPIECE A TO GRIPPING ORIENTATION →CLOSE HAND →MOVE MACHINING DEVICE A TO WORKPIECE SET ORIENTATION →EXECUTE CORRECTION PROCESSING →OPEN HAND →MOVE TO INITIAL ORIENTATION |
| MACHINING DEVICE B WORKPIECE A RELEASE | WORKPIECE RELEASE CORRECTION MODEL | OPEN HAND →MOVE MACHINING DEVICE B TO WORKPIECE RELEASE ORIENTATION →CLOSE HAND →EXECUTE CORRECTION PROCESSING →MOVE WORKPIECE A TO RELEASE ORIENTATION →OPEN HAND →MOVE TO INITIAL ORIENTATION |
| ... | ... | ... |
| MACHINING DEVICE N WORKPIECE N SET | CORRECTION MODEL | OPEN HAND →MOVE WORKPIECE N TO GRIPPING ORIENTATION →CLOSE HAND →MOVE MACHINING DEVICE N TO WORKPIECE SET ORIENTATION →EXECUTE CORRECTION PROCESSING →OPEN HAND →MOVE TO INITIAL ORIENTATION |

| MACHINING DEVICE NAME 401 | OPENING/CLOSING TASK TYPE 402 | ELAPSED TIME 403 | CHANGE TIME 404 | ESTIMATED OPENING/CLOSING STATE 405 |
|---|---|---|---|---|
| MACHINING DEVICE A | OPEN | 0 SECONDS | 1 SECONDS | OPENING |
| MACHINING DEVICE B | CLOSE | 30 SECONDS | 2 SECONDS | CLOSED |
| ... | ... | ... | ... | ... |
| MACHINING DEVICE N | CLOSE | 2 SECONDS | 5 SECONDS | CLOSING |

| ID | ORIENTATION NAME | HAND POSITION | HAND ORIENTATION |
|---|---|---|---|
| 1 | WORKPIECE A GRIPPING ORIENTATION | (50, 0, 0) | (0, 0, 0) |
| 2 | MACHINING DEVICE A WORKPIECE SET ORIENTATION | (150, -50, 40) | (0, 0, 90) |
| 3 | INITIAL ORIENTATION | (20, 0, 30) | (0, 0, 0) |
| ⋮ | ⋮ | ⋮ | ⋮ |
| M | MACHINING DEVICE N WORKPIECE SET ORIENTATION | (100, -20, 30) | (0, 0, 90) |

FIG. 6

| ID (601) | CORRECTION MODEL NAME (602) | POSITION/ORIENTATION CORRECTION END CONDITION (603) | GRIPPING POSITION CORRECTION END CONDITION (604) | INTERRUPTION CONDITION (605) | PROCESSING TIME UPPER LIMIT (606) |
|---|---|---|---|---|---|
| 1 | WORKPIECE SET CORRECTION MODEL | ESTIMATED OPENING/CLOSING STATE=CLOSED | (0,0,10) | (200,200,200) | 10 SECONDS |
| ... | ... | ... | ... | ... | ... |
| L | WORKPIECE RELEASE CORRECTION MODEL | ESTIMATED OPENING/CLOSING STATE=CLOSED | (0,0,10) | (150,150,150) | 5 SECONDS |

| TASK NAME 701 | POSITION/ORIENTATION CORRECTION AMOUNT 702 | GRIPPING POSITION CORRECTION AMOUNT 703 | PEAK VALUE 704 | FINAL VALUE 705 |
|---|---|---|---|---|
| MACHINING DEVICE A WORKPIECE A SET | (0.2, -1.2, 0.0, 3.1, 0.1, 1.2) | (0, 0, 3.1) | (24, 98, 5) | (2, 8, 2) |
| MACHINING DEVICE B WORKPIECE A RELEASE | (1.2, -0.1, 0.0, 5.2, 2.0, 0.2) | (0, 0, 1.1) | (57, 18, 3) | (7, 2, 2) |
| ... | ... | ... | ... | ... |
| MACHINING DEVICE N WORKPIECE N RELEASE | (3.2, 0.2, 0.0, 2.2, 1.0, 2.6) | (0, 0, 2.3) | (157, 22, 4) | (4, 1, 3) |

| 601 | 602 | 603 | 604 | 605 | 606 |
|---|---|---|---|---|---|
| ID | CORRECTION MODEL NAME | POSITION/ORIENTATION CORRECTION END CONDITION | GRIPPING POSITION CORRECTION END CONDITION | INTERRUPTION CONDITION | PROCESSING TIME UPPER LIMIT |
| 1 | WORKPIECE SET CORRECTION MODEL | ESTIMATED OPENING/CLOSING STATE=CLOSED; (10,10,10); | (0,0,10) | (200,200,200) | 10 SECONDS |
| ... | ... | ... | ... | ... | ... |
| L | WORKPIECE RELEASE CORRECTION MODEL | ESTIMATED OPENING/CLOSING STATE=CLOSED; (10,10,10) | (0,0,10) | (150,150,150) | 5 SECONDS |

123

METHOD FOR CONTROLLING ROBOT AND SYSTEM

CLAIM OF PRIORITY

The present application claims priority from Japanese patent application JP 2023-016326 filed on Feb. 6, 2023, the content of which is hereby incorporated by reference into this application.

BACKGROUND OF THE INVENTION

1. Field of the Invention

The present invention relates to a technique for controlling a robot which performs a task of installing a workpiece in a machining device.

2. Description of the Related Art

In the manufacturing industry, a robot which installs a workpiece in a chuck mechanism of a machining device is used. The robot performs a work of installing the workpiece in the chuck mechanism based on information regarding the gripping orientation of the workpiece and the installation orientation of the workpiece with respect to the chuck mechanism.

There is a case where the installation orientation of the workpiece with respect to the chuck mechanism deviates contrary to expectation due to a tolerance of the outer shape of the workpiece, an error in the gripping orientation, an error in installation of the robot, a control error of a movable mechanism of the robot, and the like. When a large force due to the deviation is generated between the robot and the chuck mechanism, there may be problems of a failure of the robot and the chuck mechanism and a decrease in machining accuracy.

SUMMARY OF THE INVENTION

Technical Problem

A technique described in WO 2022/172873 A is known as a technique for correcting the position and orientation of the workpiece to eliminate the deviation. WO 2022/172873 A describes a system of "controlling a robot device for correcting the position and the orientation of joint of a workpiece relative to a machine tool based on the output of the force sensor" (see claim 1 of WO 2022/172873 A). Further, WO 2022/172873 A describes "A workpiece gripping mechanism is moved parallel to a vertical center line of a chuck surface of a chuck mechanism of a machine tool, an orientation of the workpiece gripping mechanism is corrected so as to reduce a force applied in a direction orthogonal to the vertical center line while pressing the workpiece against the chuck surface with a predetermined force, and a position of the workpiece gripping mechanism is corrected along the direction orthogonal to the vertical center line so as to reduce the force applied in the direction orthogonal to the vertical center line with a closing operation of the chuck mechanism." (see claim 4 of WO 2022/172873 A).

The technique described in WO 2022/172873 A has the following problems. (1) When the shape of the end surface of the workpiece to be pressed against the chuck surface is distorted, the orientation of the workpiece after correction varies in the correction method described in WO 2022/172873 A. (2) In WO 2022/172873 A, a difference between the opening/closing speed of the chuck mechanism and the control speed of the robot is not considered. When the control speed of the robot is higher than the opening/closing speed of the chuck mechanism, the workpiece is separated from the claw of the chuck mechanism by the correction of the position and orientation of the workpiece by the robot. As a result, since the value of the force sensor decreases, the correction of the position and orientation of the workpiece is completed before the chuck mechanism is closed. Therefore, there is a possibility that the position and orientation of the workpiece are not correctly corrected.

The present invention provides a method for controlling a robot for correcting a position and an orientation of a workpiece to be installed in a machining device with high accuracy.

Solution to Problem

A representative example of the invention disclosed in the present application is as follows. That is, a method for controlling a robot executed by a computer, the computer including an arithmetic device, a storage device connected to the arithmetic device, and a network interface connected to the arithmetic device, the computer being connected to a robot including a hand which grips a workpiece, and a machining device including a gripping mechanism which grips the workpiece, the robot control method comprising: a first step of acquiring, by the computer, first operation information regarding an operation state of the robot and second operation information regarding an operation state of the machining device; and a second step of controlling, by the computer, the robot to cause the robot to perform a task of gripping the workpiece and installing the workpiece in the gripping mechanism, in which the second step includes: a third step of determining, by the computer, whether or not to start first correction processing of correcting a position and an orientation of the workpiece with respect to the gripping mechanism based on the second operation information, a fourth step of executing, by the computer, the first correction processing using the first operation information and the second operation information, and a fifth step of determining, by the computer, whether or not to end the first correction processing based on the second operation information.

Advantageous Effects of Invention

According to one embodiment of the present invention, the robot can correct the position and orientation of the workpiece to be installed in the machining device with high accuracy. The problems, configurations, and effects other than those described above will be clarified by the following description of embodiments.

BRIEF DESCRIPTION OF THE DRAWINGS

FIG. 3 is a diagram illustrating an example of a data structure of task information according to the first embodiment;

FIG. 4 is a diagram illustrating an example of a data structure of machining device information according to the first embodiment;

FIG. 5 is a diagram illustrating an example of a data structure of orientation information according to the first embodiment;

FIG. 6 is a diagram illustrating an example of a data structure of correction model information according to the first embodiment;

FIG. 7 is a diagram illustrating an example of a data structure of performance information according to the first embodiment;

FIG. 12 is a diagram illustrating an example of a data structure of correction model information according to a second embodiment.

DESCRIPTION OF THE PREFERRED EMBODIMENTS

Figure 1:
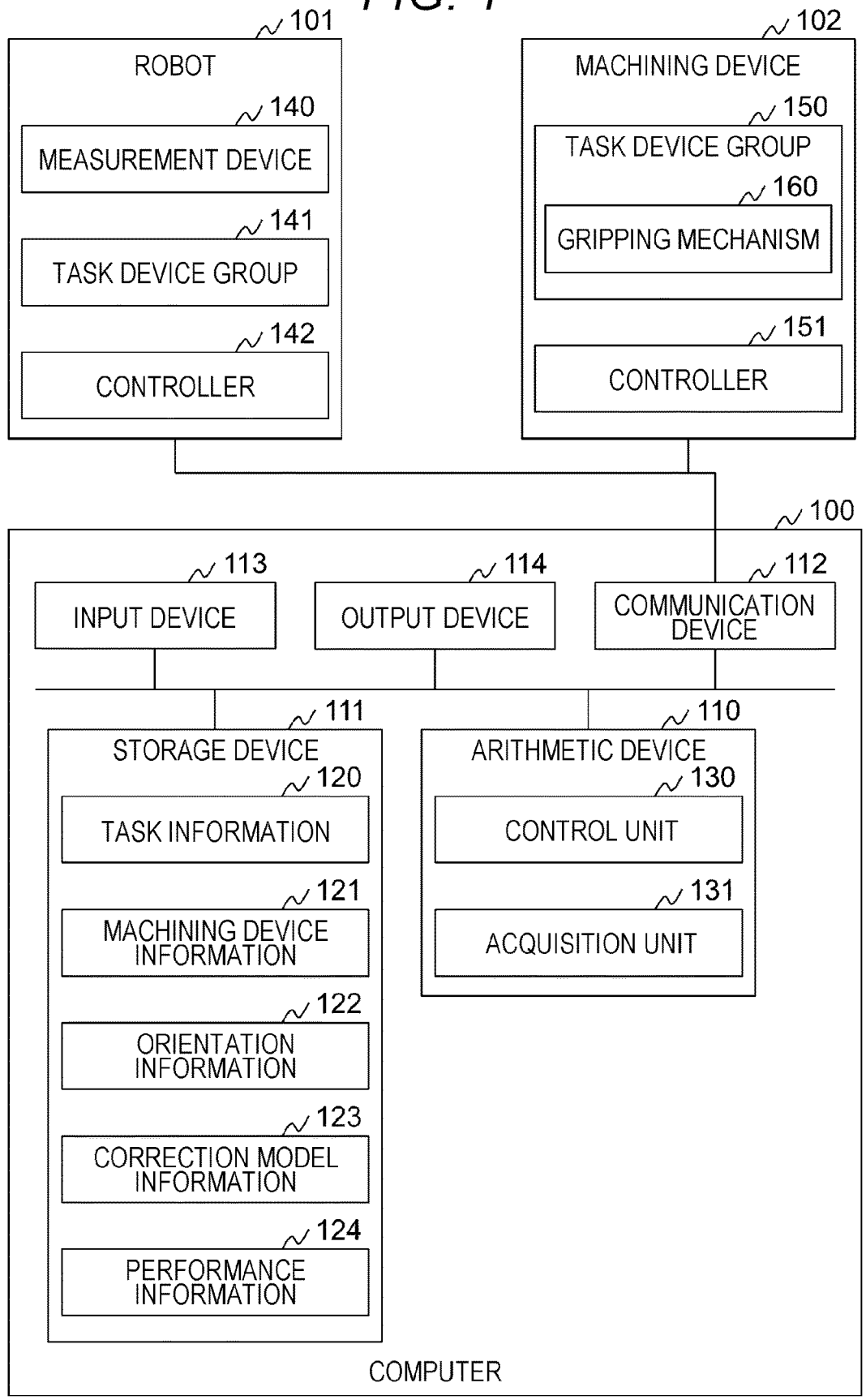
FIG. 1 is a diagram illustrating a configuration example of a system according to a first embodiment.

Hereinafter, embodiments of the present invention will be described with reference to the drawings. However, the present invention is not to be construed as being limited to the description of the following examples. Those skilled in the art can easily understand that the specific configuration can be changed without departing from the spirit or gist of the present invention.

In the configurations of the invention described below, the same or similar configurations or functions are denoted by the same reference numerals, and redundant description is omitted.

Notations such as "first", "second", and "third" in the present specification and the like are attached to identify components, and do not necessarily limit the number or order.

The position, size, shape, range, and the like of each configuration illustrated in the drawings and the like may not represent the actual position, size, shape, range, and the like in order to facilitate understanding of the invention. Therefore, the present invention is not limited to the position, size, shape, range, and the like disclosed in the drawings and the like.

First Embodiment

FIG. 1 is a diagram illustrating a configuration example of a system of a first embodiment. The system includes a computer 100, a robot 101, and a machining device 102. The system may include two or more computers 100, robots 101, and machining devices 102. The computer 100, the robot 101, and the machining device 102 are connected directly or via a network.

The robot 101 performs a task such as installation of a workpiece 201 (see FIG. 2) in the machining device 102, removal of the workpiece 201 from the machining device 102, and the like, based on control information transmitted from the computer 100. The robot 101 includes a measurement device 140, a task device group 141, and a controller 142.

The measurement device 140 measures a value for acquiring the state of the robot 101 and generates measurement data. The measurement device 140 is, for example, a general sensing device such as an acceleration sensor, a force sensor, a camera, a contact sensor, a current sensor, and the like.

The task device group 141 is a device group which realizes gripping and moving of the workpiece 201, and is, for example, a general mechanical element group such as a hand, a link, a drive motor, and the like.

The controller 142 controls the task device group 141 based on the control information received from the computer 100. For example, the controller 142 moves the hand by controlling a drive motor which connects links functioning as joints according to the control information. The controller 142 transmits operation information including the angle, the angular velocity, and the angular acceleration of the joint, the torque and the current value of the drive motor, and the like to the computer 100. The controller 142 may transmit the measurement data to the computer 100 as the operation information.

The machining device 102 performs a machining task using the workpiece 201 based on the control information transmitted from the computer 100. The machining device 102 includes a task device group 150 and a controller 151.

The task device group 150 is a device group which realizes a machining task using the workpiece 201. The task device group 150 includes a gripping mechanism 160 such as a chuck. The gripping mechanism 160 grips the workpiece 201 with at least one of a point, a line, and a surface.

The controller 151 controls the task device group 150 based on the control information received from the computer 100. The controller 151 transmits operation information including information related to opening/closing control of the gripping mechanism 160, and the like to the computer 100.

The computer 100 includes an arithmetic device 110, a storage device 111, a communication device 112, an input device 113, and an output device 114. The hardware elements are connected via, for example, an internal bus, but the present invention is not limited to this method.

The input device 113 is a device which inputs data, commands, and the like to the computer 100. The input device 113 may include a keyboard, a mouse and the like. The output device 114 is a device which outputs a control value change result and the like. The output device 114 may include a display, a printer and the like. The communication device 112 is a device for communicating with an external device, and is, for example, a network interface card (NIC).

The storage device 111 is a device which stores a program and information executed by the arithmetic device 110. The storage device 111 is, for example, a hard disk drive (HDD), a solid state drive (SSD), or the like. The storage device 111 also stores information input via the input device 113 and a calculation result of the program. The storage device 111 is also used as a work area.

The storage device 111 stores task information 120, machining device information 121, orientation information 122, correction model information 123, and performance information 124.

The task information 120 is information for managing the content of a task performed by the robot 101. A data structure of the task information 120 will be described with reference to FIG. 3. The machining device information 121 is information for managing the state of the machining device 102. A data structure of the machining device information 121 will be described with reference to FIG. 4. The orientation information 122 is information for managing the position and the orientation of the robot 101 in a task. A data structure of orientation information 122 will be described with reference to FIG. 5.

The correction model information 123 is information for managing a correction model which realizes correction of the position and the orientation of the workpiece 201 with respect to the gripping mechanism 160. A data structure of the correction model information 123 will be described with reference to FIG. 6.

The performance information 124 is information for managing the performance of the correction control. A data structure of the performance information 124 will be described with reference to FIG. 7.

The arithmetic device 110 is a device which controls the computer 100, and is, for example, a central processing unit (CPU), a graphics processing unit (GPU), a field programmable gate array (FPGA), or the like. The arithmetic device 110 executes a program stored in the storage device 111. The arithmetic device 110 executes processing according to the program to operate as a functional unit (module) which realizes a specific function. In the following description, when processing is described with a functional unit as a subject, it indicates that the arithmetic device 110 executes a program for realizing the functional unit. The arithmetic device 110 of the first embodiment functions as a control unit 130 and an acquisition unit 131.

The control unit 130 performs various controls related to a task. The acquisition unit 131 acquires information (operation information) related to the operation states of the robot 101 and the machining device 102. The acquisition unit 131 acquires, for example, measurement data as operation information of the robot 101, and acquires a control signal inside the machining device 102, a control parameter of the task device group 150, or the like as operation information of the machining device 102. Note that the acquisition unit 131 may acquire the operation information from a device other than the robot 101 and the machining device 102. For example, the acquisition unit 131 may acquire an image captured by a camera installed in the work space as the operation information of the robot 101 and the machining device 102. In this case, the acquisition unit 131 executes information processing such as data conversion and data analysis as necessary, and specifies the operation states of the robot 101 and the machining device 102.

Note that, regarding the functional units included in the computer 100, a plurality of functional units may be integrated into one functional unit, or one functional unit may be divided into a plurality of functional units for each function.

Figure 2:
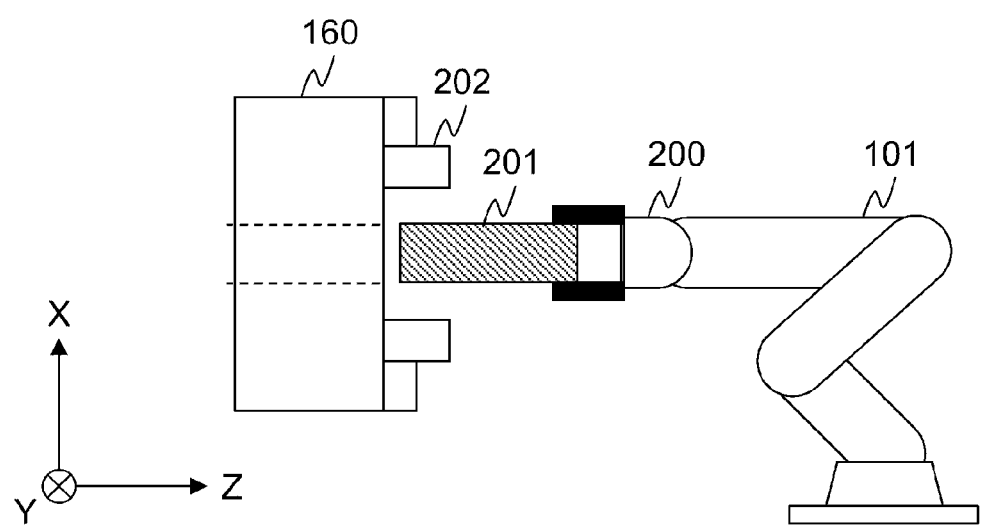
FIG. 2 is a diagram illustrating an example of a task in the system according to the first embodiment.

FIG. 2 is a diagram illustrating an example of a task in the system according to the first embodiment. FIG. 2 illustrates the robot 101 and the machining device 102 installed in the three-dimensional space as viewed from an XZ plane.

The robot 101 grips the workpiece 201 using the hand 200, and moves the workpiece 201 in order to install the workpiece 201 on the gripping mechanism 160. The gripping mechanism 160 grips the workpiece 201 using claws 202 and performs machining work.

FIG. 3 is a diagram illustrating an example of a data structure of the task information 120 according to the first embodiment.

The task information 120 stores an entry including a task name 301, a correction model name 302, and a task description 303. One entry is prepared for one task. Note that the fields included in the entry are not limited to those described above. The entry may not include any of the fields described above, or may include other fields.

The task name 301 is a field for storing a name of a task. The correction model name 302 is a field for storing a name of a correction model used in a task. The task description 303 is a field for storing description of a task. The task is defined as a sequence of element tasks. The task description 303 stores a sequence of element tasks.

FIG. 4 is a diagram illustrating an example of a data structure of the machining device information 121 according to the first embodiment.

The machining device information 121 stores an entry including a machining device name 401, an opening/closing task type 402, an elapsed time 403, a change time 404, and an estimated opening/closing state 405. One entry is prepared for one machining device 102. Note that the fields included in the entry are not limited to those described above. The entry may not include any of the fields described above, or may include other fields.

The machining device name 401 is a field for storing a name of the machining device 102.

The opening/closing task type 402 is a field for storing a task type of the gripping mechanism 160. In a case where the operation information of the machining device 102 includes information indicating that the task of opening the gripping mechanism 160 has started, such as a start signal of the task of opening the gripping mechanism 160, the acquisition unit 131 sets "open" as the opening/closing task type 402. In a case where the operation information of the machining device 102 includes information indicating that the task of closing the gripping mechanism 160 has started, such as a start signal of the task of closing the gripping mechanism 160, the acquisition unit 131 sets "close" in the opening/closing task type 402.

The elapsed time 403 is a field for storing an elapsed time from the detection of the start of the task of opening the gripping mechanism 160 or the task of closing the gripping mechanism 160.

The change time 404 is a field for storing a time (change time) required for the task of opening the gripping mechanism 160 or the task of closing the gripping mechanism 160. The value of the change time 404 is set in advance.

The estimated opening/closing state 405 is a field for storing an estimated state of an opening/closing task of the gripping mechanism 160. For example, in a case where the elapsed time is shorter than the change time, the acquisition unit 131 sets a value indicating that the task corresponding to the opening/closing task type 402 is being executed in the estimated opening/closing state 405. In a case where the elapsed time is longer than the change time, the acquisition unit 131 sets a value indicating that the task corresponding to the opening/closing task type 402 is completed in the estimated opening/closing state 405.

FIG. 5 is a diagram illustrating an example of a data structure of orientation information 122 according to the first embodiment.

The orientation information 122 stores an entry including an ID 501, an orientation name 502, a hand position 503, and a hand orientation 504. One entry is prepared for one orientation. Note that the fields included in the entry are not limited to those described above. The entry may not include any of the fields described above, or may include other fields.

The ID 501 is a field for storing identification information of an entry. The orientation name 502 is a field for storing a name of an orientation. The task description 303 may include an element task including a name of an orientation.

The hand position 503 is a field for storing three-dimensional coordinates indicating the position of the hand 200. The hand orientation 504 is a field for storing an angle (yaw angle, pitch angle, roll angle) indicating the orientation of the hand 200.

In a case of performing an element task including the name of the orientation, the control unit 130 refers to the orientation information 122 to acquire information on the position and the orientation of the hand 200. The control unit 130 generates a trajectory of the hand 200 based on the current position and orientation of the hand 200 and the acquired position and orientation of the hand. For example, the trajectory is generated using a known technique such as rapidly exploring random tree (RRT), point-to-point (PTP), and the like.

Note that information on the trajectory may be stored in advance in the orientation information 122. In addition, the computer 100 may not hold the orientation information 122. In this case, the computer 100 calculates the position and the orientation of the robot 101 from the position of the workpiece 201 and the like.

FIG. 6 is a diagram illustrating an example of a data structure of the correction model information 123 according to the first embodiment.

The correction model information 123 stores an entry including an ID 601, a correction model name 602, a position/orientation correction end condition 603, a gripping position correction end condition 604, an interruption condition 605, and a processing time upper limit 606. One entry is prepared for one correction model. Note that the fields included in the entry are not limited to those described above. The entry may not include any of the fields described above, or may include other fields.

The ID 601 is a field for storing identification information of an entry. The correction model name 602 is a field for storing a name of a correction model.

The position/orientation correction end condition 603 is a field which stores an end condition of the position and orientation correction for correcting the position/orientation of the workpiece 201 with respect to the gripping mechanism 160. The position/orientation correction end condition 603 stores a condition related to an estimated state of the opening/closing task of the gripping mechanism 160. In a case where the estimated opening/closing state 405 indicates "closed", the control unit 130 ends the movement orientation correction.

The gripping position correction end condition 604 is a field which stores an end condition of the gripping position correction for correcting the gripping position of the workpiece 201 of the gripping mechanism 160. The gripping position correction end condition 604 stores thresholds of force values on the X, Y, and Z axes in the relative coordinate system of the hand 200. In a case where the force value of each of the X axis, the Y axis, and the Z axis is greater than the thresholds set in the position/orientation correction end condition 603, the control unit 130 ends the gripping position correction.

The interruption condition 605 is a field for storing an interruption condition of correction. The interruption condition 605 stores thresholds of force values on the X axis, the Y axis, and the Z axis in the relative coordinate system of the hand 200. The control unit 130 interrupts the correction in a case where the force value on any one of the X axis, the Y axis, and the Z axis is greater than the threshold set in the interruption condition 605.

The processing time upper limit 606 is a field for storing an upper limit of the processing time required for correction. In a case where the processing time is longer than the value of the processing time upper limit 606, the control unit 130 ends the correction.

FIG. 7 is a diagram illustrating an example of a data structure of performance information 124 according to the first embodiment.

The performance information 124 stores an entry including a task name 701, a position/orientation correction amount 702, a gripping position correction amount 703, a peak value 704, and a final value 705. One entry is prepared for one task. Note that the fields included in the entry are not limited to those described above. The entry may not include any of the fields described above, or may include other fields.

The task name 701 is a field for storing a name of a task.

The position/orientation correction amount 702 is a field for storing a correction amount in the position/orientation correction. The position/orientation correction amount 702 stores movement amounts of the hand 200 on the X axis, the Y axis, and the Z axis, and change amounts of the yaw angle, the pitch angle, and the roll angle.

The gripping position correction amount 703 is a field for storing a correction amount in the gripping position correction. The gripping position correction amount 703 stores movement amounts of the hand 200 on the X axis, the Y axis, and the Z axis. Since the orientation of the workpiece 201 is not corrected in the gripping position correction, the gripping position correction amount 703 does not include the change amounts of the yaw angle, the pitch angle, and the roll angle.

The peak value 704 is a field for storing the maximum force value in the task. The final value 705 is a field for storing a force value in a case where the task is completed.

Figure 8A:
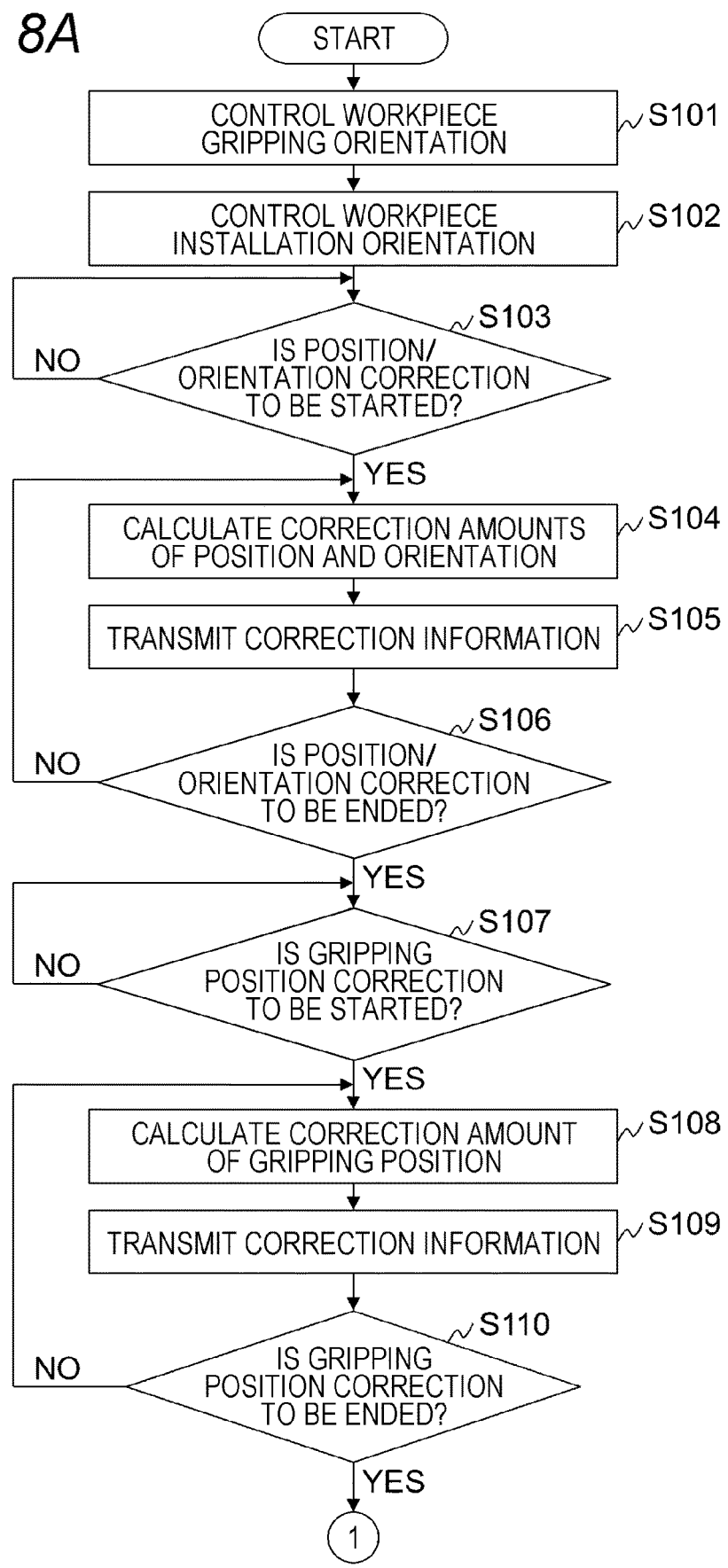
FIG. 8A is a flowchart for describing an example of task control processing executed by a computer according to the first embodiment.
Figure 8B:
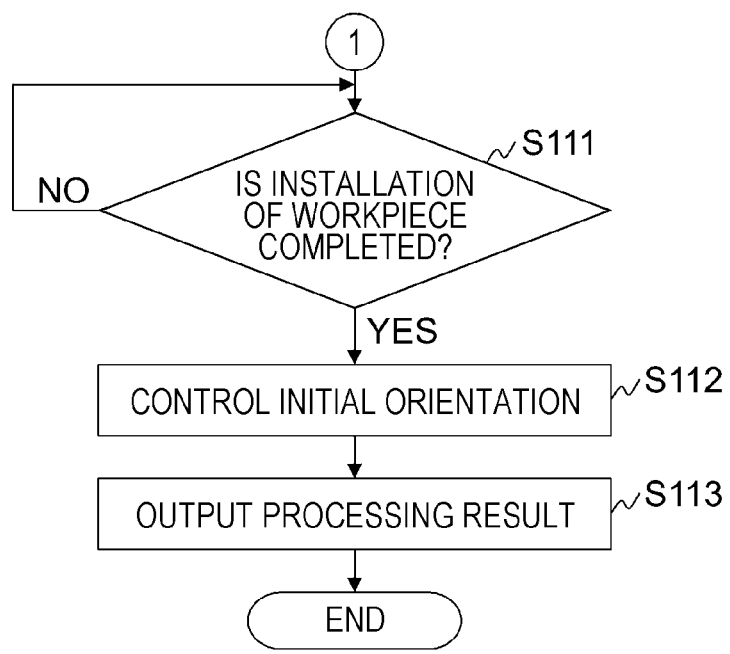
FIG. 8B is a flowchart illustrating an example of task control processing executed by the computer according to the first embodiment.
Figure 9A:
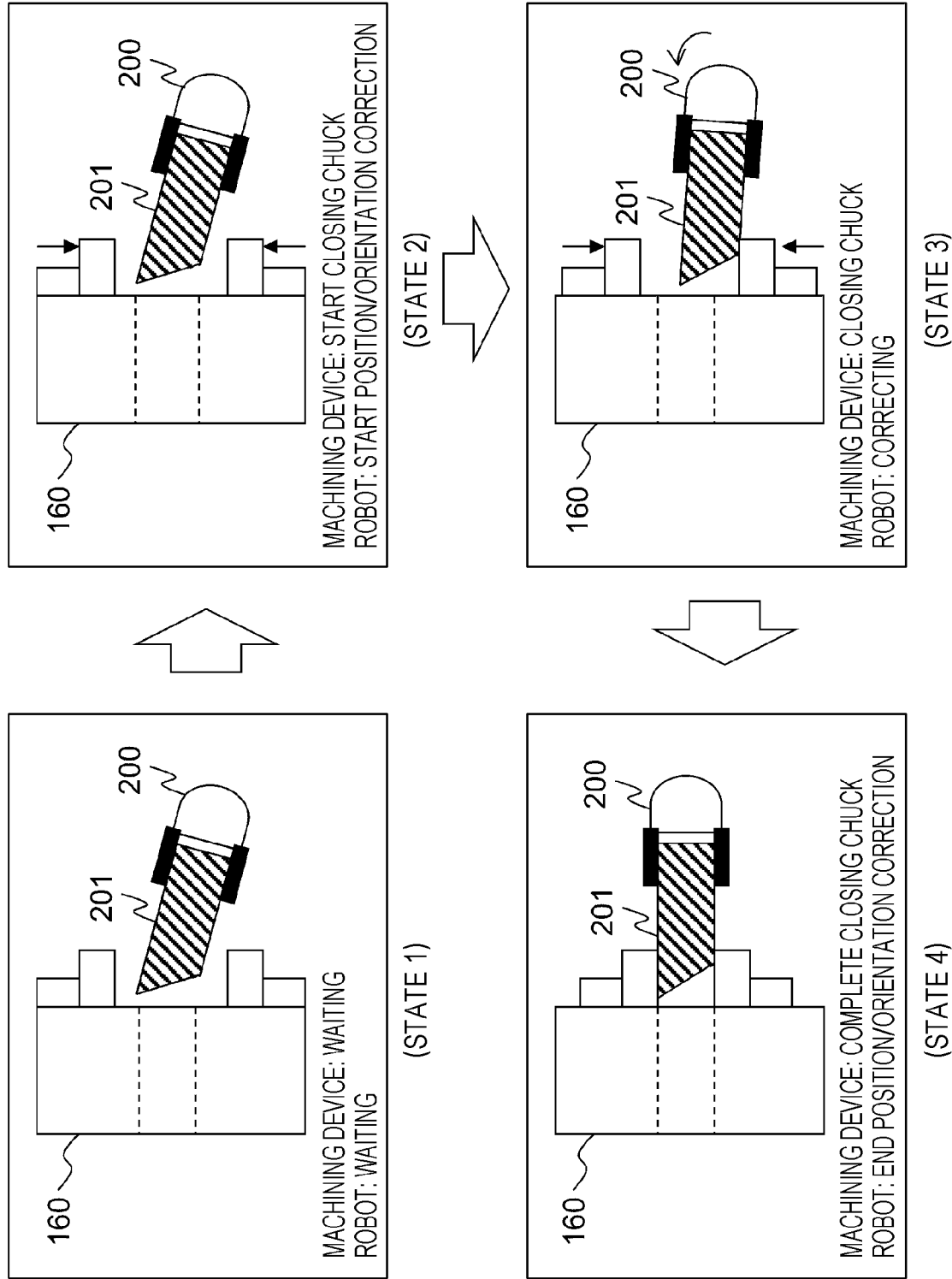
FIG. 9A is a diagram illustrating a specific example of correction processing executed by the computer according to the first embodiment.
Figure 9B:
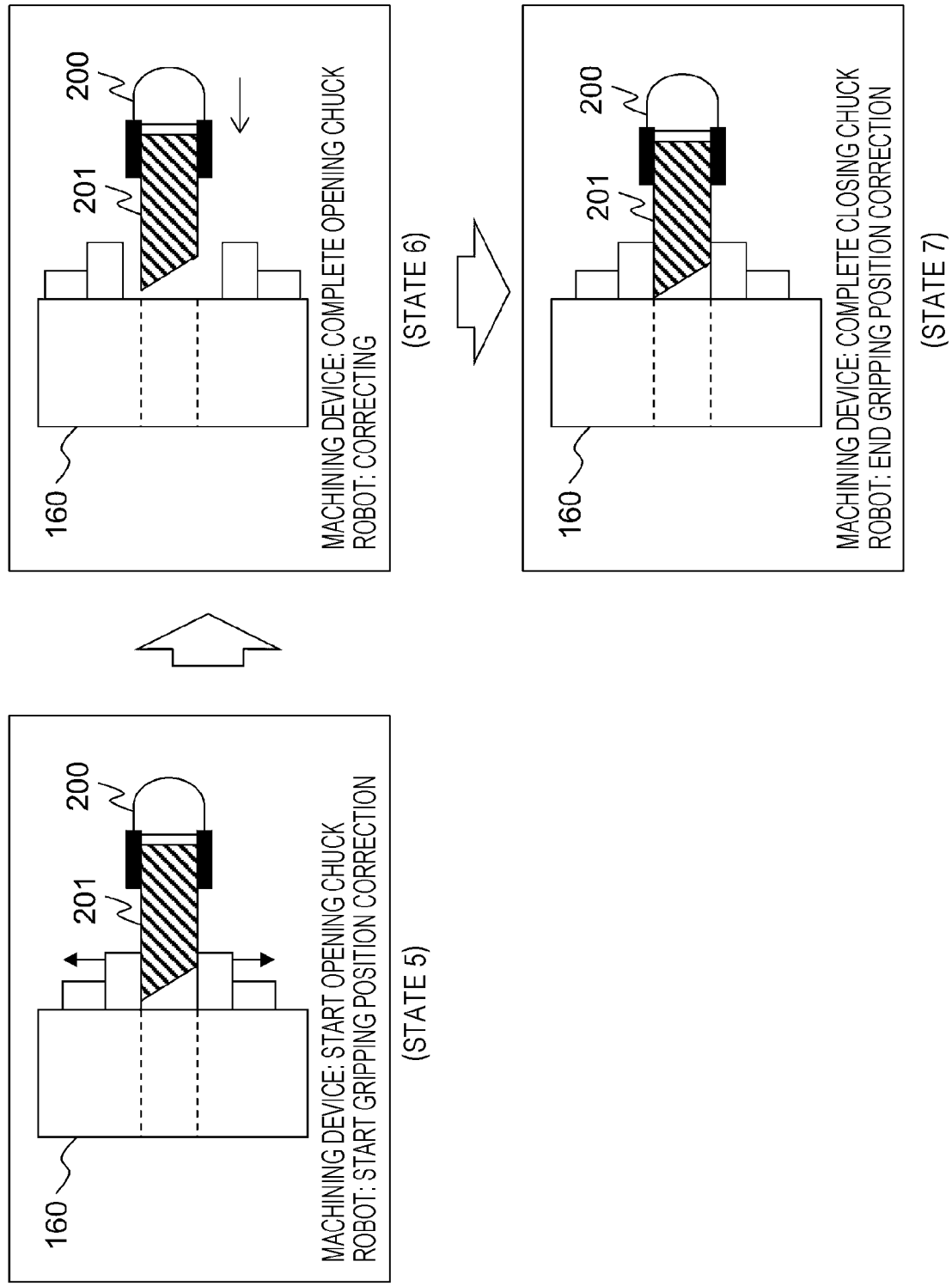
FIG. 9B is a diagram illustrating a specific example of correction processing executed by the computer according to the first embodiment.

FIGS. 8A and 8B are flowcharts for explaining an example of task control processing executed by the computer 100 according to the first embodiment. FIGS. 9A and 9B are diagrams illustrating specific examples of correction processing executed by the computer 100 according to the first embodiment.

Here, control processing of task in which the robot 101 grips the workpiece 201 and installs the workpiece 201 in the machining device 102 will be described.

The control unit 130 controls the workpiece gripping orientation of the robot 101 based on the operation information, the task information 120, and the orientation information 122 of the robot 101 (step S101). For example, the control unit 130 generates a trajectory for transition from the current position/orientation of the hand 200 to the workpiece gripping orientation, generates control information of the robot 101 based on the trajectory, and transmits the control information.

The control unit 130 controls the workpiece installation orientation of the robot 101 based on the operation information, the task information 120, and the orientation information 122 of the robot 101 (step S102). For example, the control unit 130 generates a trajectory for transition from the current position and orientation of the hand 200 to the workpiece installation orientation, generates control information of the robot 101 based on the trajectory, and transmits the control information.

Here, it is assumed that the positional relationship among the hand 200, the gripping mechanism 160, and the workpiece 201 of the robot 101 is (state 1) in FIG. 9A. In a case where the gripping mechanism 160 is closed in the positional relationship illustrated in (state 1), a large force acts between the hand 200 and the gripping mechanism 160, and there is a possibility that a failure or the like of the hand 200 occurs. Therefore, it is necessary to correct the position and orientation of the workpiece 201.

The control unit 130 refers to the machining device information 121 and determines whether or not to start position/orientation correction (step S103).

Specifically, the control unit 130 determines whether the opening/closing task type 402 of the entry corresponding to the machining device 102 in which the workpiece 201 is installed is "closed". In a case where the opening/closing task type 402 is "closed", the control unit 130 starts position/orientation correction. That is, as illustrated in (state 2) of FIG. 9A, in a case where the gripping mechanism 160 starts the task of closing, the control unit 130 starts the position/orientation correction.

In a case where the opening/closing task type 402 is "open", the control unit 130 returns to step S103 after a lapse of a certain period of time.

In a case where the opening/closing task type 402 is "closed", the control unit 130 starts position/orientation correction and calculates correction amounts of the position and orientation of the workpiece 201 based on the position, orientation, and force value of the robot 101 (step S104).

In the position/orientation correction, the insertion orientation of the workpiece 201 with respect to the gripping mechanism 160 is corrected in consideration of the force acting on the robot 101. For example, the control unit 130 calculates the correction amounts of the position and orientation of the workpiece 201 such that the force value decreases and the center of gravity of the workpiece 201 is at a predetermined position of the gripping mechanism 160. Here, the predetermined position of the gripping mechanism 160 means a position on the XY plane in FIG. 2.

The control unit 130 transmits the correction information including the position and orientation of the hand 200 corrected based on the correction amount to the robot 101 (step S105). As shown in (state 3) of FIG. 9A, the robot 101 moves and rotates the hand 200 based on the correction information.

The control unit 130 determines whether or not to end the position/orientation correction based on the operation information of the robot 101 and the correction model information 123 (step S106).

Specifically, the control unit 130 determines whether or not the estimated opening/closing state 405 of the entry corresponding to the machining device 102 in which the workpiece 201 is installed is "closed". That is, as illustrated in (state 4) of FIG. 9A, in a case where the gripping mechanism 160 completes the closing work, the control unit 130 ends the position/orientation correction.

In a case where the position/orientation correction end condition 603 is not satisfied, the control unit 130 returns to step S104 and executes similar processing.

In a case where the position/orientation correction end condition 603 is satisfied, the control unit 130 refers to the machining device information 121 and determines whether or not to start correction of the gripping position (step S107).

Specifically, the control unit 130 determines whether the opening/closing task type 402 of the entry corresponding to the machining device 102 in which the workpiece 201 is installed is "open". In a case where the opening/closing task type 402 is "open", the control unit 130 starts correction of the gripping position. That is, as illustrated in (state 5) of FIG. 9B, in a case where the gripping mechanism 160 starts an opening task, the control unit 130 starts to correct the gripping position.

After starting the correction of the gripping position, the control unit 130 calculates the correction amount of the gripping position of the workpiece 201 based on the position, orientation, and force value of the robot 101 (step S108).

In the correction of the gripping position, the depth of insertion of the workpiece 201 into the gripping mechanism 160 is corrected so that the workpiece 201 does not fall off from the gripping mechanism 160. For example, the control unit 130 calculates the correction amount of the gripping position of the workpiece 201 so that the force value acting on the workpiece 201 by the contact of the gripping mechanism 160 is greater than a predetermined threshold, and the current position and orientation of the workpiece 201 can be maintained. Here, the insertion depth means a position in the Z direction in FIG. 2.

The control unit 130 transmits the correction information including the position and orientation of the hand 200 corrected based on the correction amount to the robot 101 (step S109). The robot 101 moves the hand 200 in a direction in which the workpiece 201 is pushed into the gripping mechanism 160 as illustrated in (state 6) of FIG. 9B based on the correction information.

The control unit 130 determines whether or not to end the correction of the gripping position based on the operation information of the robot 101 and the correction model information 123 (step S110).

Specifically, the control unit 130 determines whether the force values on the X axis, the Y axis, and the Z axis in the relative coordinate system of the hand 200 are greater than the value of the position/orientation correction end condition 603. That is, as illustrated in (state 7) of FIG. 9B, in a case where the force of pressing the workpiece 201 against the gripping mechanism 160 is greater than the threshold, that is, in a case where the workpiece 201 is inserted sufficiently deep into the gripping mechanism 160, the control unit 130 ends the gripping position correction.

In a case where the interruption condition is satisfied or the execution time is longer than the processing time upper limit 606 during the execution of the position/orientation correction, the control unit 130 interrupts the correction and outputs an error. Similar control is performed for the gripping position correction.

The control unit 130 determines whether the installation of the workpiece 201 in the gripping mechanism 160 is completed (step S111).

Specifically, the control unit 130 determines whether or not the estimated opening/closing state 405 of the entry corresponding to the machining device 102 in which the workpiece 201 is installed is "closed". In a case where the estimated opening/closing state 405 is "closed", the control unit 130 determines that the installation of the workpiece 201 in the gripping mechanism 160 is completed.

In a case where the installation of the workpiece 201 in the gripping mechanism 160 is not completed, the control unit 130 returns to step S111 after a lapse of a certain time.

In a case where the installation of the workpiece 201 in the gripping mechanism 160 is completed, the control unit 130 performs control for returning the robot 101 to the initial orientation (step S112). Furthermore, the control unit 130 outputs the processing result (step S113), and ends the processing.

Figure 10:
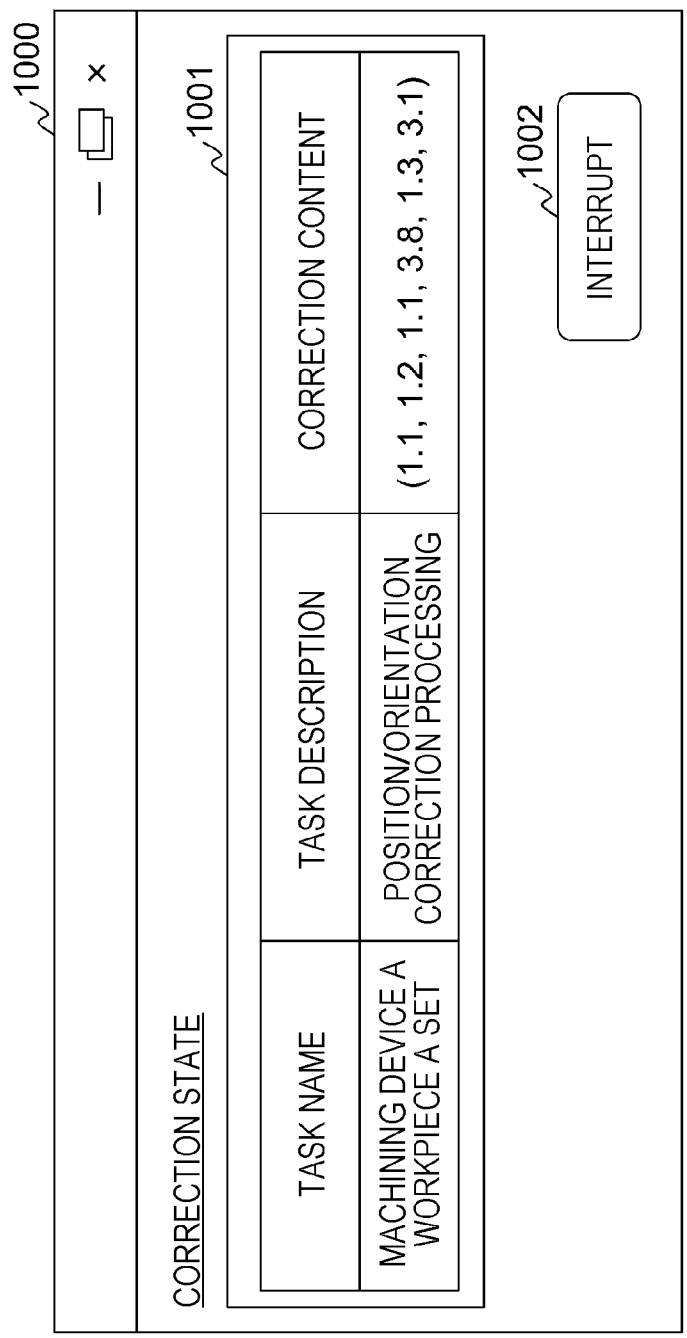
FIG. 10 is a diagram illustrating an example of a screen presented by the computer according to the first embodiment.
Figure 11:
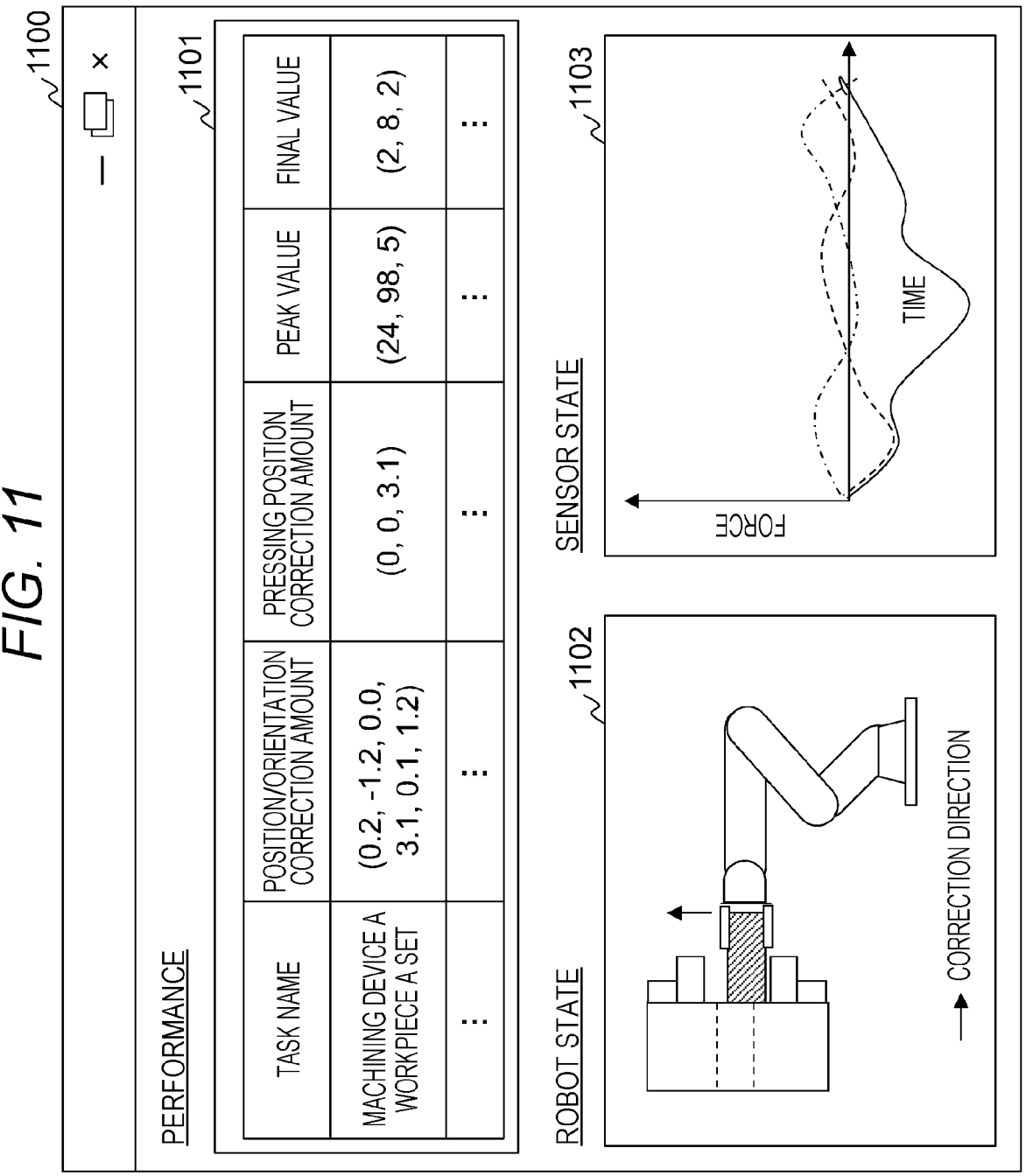
FIG. 11 is a diagram illustrating an example of a screen presented by the computer according to the first embodiment.

FIGS. 10 and 11 are diagrams illustrating an example of a screen presented by the computer 100 according to the first embodiment.

A screen 1000 is a screen for presenting information related to correction being executed. The screen 1000 includes a display field 1001 and an interruption button 1002.

In the display field 1001, the name of the task to be corrected, the type of correction, the correction amount, and the like are displayed. The interruption button 1002 is an operation button for instructing interruption of correction.

A screen 1100 is a screen for presenting information related to actual performance of correction. The screen 1100 includes display fields 1101, 1102, and 1103.

The display field 1101 is a field for displaying the performance information 124. Only a part of the performance information 124 may be displayed in the display field 1101. The display field 1102 is a field for displaying an image for reproducing the movement of the robot 101 by the correction. The display field 1103 is a field for displaying a graph indicating a force value at the time of task.

The position/orientation correction can suppress variations in the position and orientation of the workpiece 201 even in a case where the shape of the end surface of the workpiece 201 in contact with the gripping mechanism 160 is distorted. Therefore, the workpiece 201 can be installed on the gripping mechanism 160 at the correct position and orientation.

Furthermore, the control unit 130 controls the start and end of the position/orientation correction based on the opening/closing state of the gripping mechanism 160. As a result, the correction can be performed without being affected by the contact state between the workpiece 201 and the gripping mechanism 160 and the difference in operating speed between the robot 101 and the gripping mechanism 160. Therefore, the accuracy of correction can be improved.

In the gripping position correction, the workpiece 201 can be prevented from falling off from the gripping mechanism 160 by moving the workpiece 201 so as to be pushed into the gripping mechanism 160.

Furthermore, the control unit 130 controls the start of the gripping position correction based on the opening/closing state of the gripping mechanism 160, and controls the end of the gripping position correction based on the force acting on the robot 101. As a result, the correction can be performed without being affected by the contact state between the workpiece 201 and the gripping mechanism 160 and the difference in operating speed between the robot 101 and the gripping mechanism 160. Therefore, the accuracy of correction can be improved.

As described above, the computer 100 according to the first embodiment can correct the position and orientation of the workpiece 201 to be installed in the machining device 102 with high accuracy by performing the position/orientation correction and the gripping position correction.

Second Embodiment

In the second embodiment, a correction end condition is different from that in the first embodiment. Hereinafter, the second embodiment will be described focusing on a difference from the first embodiment.

The configuration of the system of the second embodiment is the same as that of the first embodiment. The task information 120, the machining device information 121, the orientation information 122, and the performance information 124 of the second embodiment are the same as those of the first embodiment.

In the second embodiment, the content of the correction model information 123 is partially different. FIG. 12 is a diagram illustrating an example of a data structure of the correction model information 123 according to the second embodiment.

The structure of the entry stored in the correction model information 123 is the same as that of the first embodiment. The second embodiment is different from the first embodiment in the content set in the position/orientation correction end condition 603.

The position/orientation correction end condition 603 stores the opening/closing state of the gripping mechanism 160 and thresholds of the X axis, Y axis, and Z axis forces in the relative coordinate system of the hand 200. The control unit 130 ends the movement orientation correction in a case where the force value of each of the X axis, the Y axis, and the Z axis is smaller than the threshold set in the position/orientation correction end condition 603 and the estimated opening/closing state 405 is "closed".

The task control processing executed by the computer 100 of the second embodiment is partially different from that of the first embodiment. Specifically, a method of determining the end of the position/orientation correction is different.

In addition, in a case where the gripping mechanism 160 is already closed in the determination of the end of the position/orientation correction, the control unit 130 instructs the machining device 102 to open the gripping mechanism 160 and close the gripping mechanism after a certain period of time has elapsed.

According to the second embodiment, position/orientation correction with higher accuracy can be realized.

Note that the present invention is not limited to the above-described embodiments, and includes various modifications. For example, the above-described embodiments have been described in detail in order to simply describe the present invention, and are not necessarily limited to those having all the described configurations. In addition, it is also possible to add, delete, and replace other configurations for a part of the configuration of each embodiment.

In addition, a part or all of the above-described configurations, functions, processors, processing means, and the like may be realized by hardware, for example, by designing with an integrated circuit. In addition, the present invention can also be realized by a program code of software that realizes the functions of the embodiments. In this case, a storage medium in which the program code is recorded is provided to a computer, and a processor included in the computer reads the program code stored in the storage medium. In this case, the program code itself read from the storage medium realizes the functions of the above-described embodiments, and the program code itself and the storage medium storing the program code constitute the present invention. As a storage medium for supplying such a program code, for example, a flexible disk, a CD-ROM, a DVD-ROM, a hard disk, a solid state drive (SSD), an optical disk, a magneto-optical disk, a CD-R, a magnetic tape, a non-volatile memory card, a ROM, or the like is used.

In addition, the program code for realizing the functions described in the present embodiment can be implemented by a wide range of programs or script languages such as assembler, C/C++, perl, Shell, PHP, Python, Java (registered trademark), and the like.

Furthermore, a program code of software that realizes the functions of the embodiments may be distributed via a network to be stored in a storage means such as a hard disk or a memory of a computer or a storage medium such as a CD-RW or a CD-R, and a processor included in the computer may read and execute the program code stored in the storage means or the storage medium.

In addition, the control lines and the information lines indicate those necessary for the description, and do not necessarily indicate all the control lines and the information lines on the product. All the configurations may be connected to each other.

What is claimed is:

1. A method for controlling a robot executed by a computer,
the computer including
an arithmetic device, a storage device connected to the arithmetic device, and a network interface connected to the arithmetic device,
the computer being connected to a robot including a hand which grips a workpiece, and a machining device including a gripping mechanism which grips the workpiece,
the method for controlling the robot comprising:
a first step of acquiring, by the computer, first operation information regarding an operation state of the robot and second operation information regarding an operation state of the machining device; and
a second step of controlling, by the computer, the robot to cause the robot to perform a task of gripping the workpiece and installing the workpiece in the gripping mechanism,
wherein the second step includes:
a third step of determining, by the computer, whether or not to start first correction processing of correcting a position and an orientation of the workpiece with respect to the gripping mechanism based on the second operation information;
a fourth step of executing, by the computer, the first correction processing using the first operation information and the second operation information; and
a fifth step of determining, by the computer, whether or not to end the first correction processing based on the second operation information.

2. The method of controlling the robot according to claim 1, wherein
the third step includes a step of starting, by the computer, the first correction processing in a case where a task of closing the gripping mechanism starts, and
the fifth step includes a step of ending the first correction processing in a case where the task of closing the gripping mechanism is completed.

3. The method of controlling the robot according to claim 2, wherein
the fifth step includes a step of determining, by the computer, whether or not the task of closing the gripping mechanism is completed based on an elapsed time from start of the task of closing the gripping mechanism.

4. The method of controlling the robot according to claim 3, wherein
the fifth step includes a step of ending, by the computer, the first correction processing in a case where the task of closing the gripping mechanism is completed and a force acting on the hand is smaller than a threshold value.

5. The method of controlling the robot according to claim 1, wherein
the second step includes:
a sixth step of determining, by the computer, whether or not to start second correction processing of correcting a gripping position of the workpiece of the gripping mechanism based on the second operation information;
a seventh step of executing, by the computer, the second correction processing using the first operation information and the second operation information; and
an eighth step of determining, by the computer, whether or not to end the second correction processing based on the first operation information.

6. The method of controlling the robot according to claim 5, wherein
the sixth step includes a step of starting, by the computer, the second correction processing in a case where a task of opening the gripping mechanism starts, and
the eighth step includes a step of ending, by the computer, the second correction processing in a case where a force of pressing the workpiece against the gripping mechanism is greater than a threshold value.

7. The method of controlling the robot according to claim 5, wherein
the computer executes the sixth step, the seventh step, and the eighth step after executing the fifth step.

8. The method of controlling the robot according to claim 7, wherein
the fourth step includes a step of interrupting, by the computer, the first correction processing in a case where a force equal to or greater than a predetermined value acts on the hand or in a case where an execution time of the first correction processing is equal to or greater than a predetermined value, and
the seventh step includes a step of interrupting, by the computer, the second correction processing in a case where a force equal to or greater than a predetermined value acts on the hand or in a case where an execution time of the second correction processing is equal to or greater than a predetermined value.

9. The method of controlling the robot according to claim 7, wherein
the gripping mechanism grips the workpiece with at least one of a point, a line, and a surface.

10. A system comprising a computer, a robot including a hand which grips a workpiece, and a machining device including a gripping mechanism which grips the workpiece,
wherein the computer
acquires first operation information regarding an operation state of the robot and second operation information regarding an operation state of the machining device, and
executes a robot control processing to cause the robot to perform a task of gripping the workpiece and installing the workpiece in the gripping mechanism,
in the robot control processing, the computer executes position/orientation correction including:
first processing of determining whether or not to start first correction processing of correcting a position and an orientation of the workpiece with respect to the gripping mechanism based on the second operation information;
second processing of executing the first correction processing using the first operation information and the second operation information; and third processing of determining whether or not to end the first correction processing based on the second operation information.

11. The system according to claim 10, wherein
in the first processing, the computer starts the first correction processing in a case where a task of closing the gripping mechanism starts, and
in the third processing, the computer ends the first correction processing in a case where the task of closing the gripping mechanism is completed.

12. The system according to claim 11, wherein
in the third processing, the computer ends the first correction processing in a case where the task of closing the gripping mechanism is completed and a force acting on the hand is smaller than a threshold value.

13. The system according to claim 10, wherein
in the robot control processing, the computer executes gripping position correction including:
fourth processing of determining whether or not to start second correction processing of correcting a gripping position of the workpiece of the gripping mechanism based on the second operation information;
fifth processing of executing the second correction processing using the first operation information and the second operation information; and
sixth processing of determining whether or not to end the second correction processing based on the first operation information.

14. The system according to claim 13, wherein
in the fourth processing, the computer starts the second correction processing in a case where the task of opening the gripping mechanism starts, and
in the sixth processing, the computer ends the second correction processing in a case where a force of pressing the workpiece against the gripping mechanism is greater than a threshold value.

15. The system according to claim 13, wherein
the gripping position correction is executed after execution of the position/orientation correction.

* * * * *